(12) United States Patent
Shoji et al.

(10) Patent No.: US 10,245,954 B2
(45) Date of Patent: *Apr. 2, 2019

(54) VEHICLE DISPLAY DEVICE AND DISPLAY METHOD THEREOF

(71) Applicant: Yazaki Corporation, Minato-ku, Tokyo (JP)

(72) Inventors: Kazumasa Shoji, Shizuoka (JP); Ryoko Sone, Shimada (JP); Masayuki Ichikawa, Shizuoka (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/872,093

(22) Filed: Jan. 16, 2018

(65) Prior Publication Data

US 2018/0215264 A1    Aug. 2, 2018

(30) Foreign Application Priority Data

Jan. 31, 2017    (JP) ................. 2017-015351

(51) Int. Cl.
*B60K 35/00*  (2006.01)
*B60K 37/02*  (2006.01)

(52) U.S. Cl.
CPC .............. *B60K 35/00* (2013.01); *B60K 37/02* (2013.01); *B60K 2350/106* (2013.01); *B60K 2350/1072* (2013.01); *B60K 2350/206* (2013.01)

(58) Field of Classification Search
CPC ....................................................... B60K 35/00
USPC ........................................ 340/462, 425.5, 438
See application file for complete search history.

(56) References Cited

U.S. PATENT DOCUMENTS

2006/0092001 A1    5/2006  Yokota et al.
2011/0285683 A1*  11/2011  Todorovich .......... G09G 3/2003
                                                         345/208

FOREIGN PATENT DOCUMENTS

JP         2006-132950 A    5/2006

* cited by examiner

*Primary Examiner* — Daryl C Pope
(74) *Attorney, Agent, or Firm* — Sughrue Mion, PLLC

(57) ABSTRACT

A vehicle display device includes an image display device and a frame member. The image display device is disposed in front of a driver in a vehicle and displays an image. The frame member is disposed on a driver side of the image display device and surrounds a part of an image display region in the image display device. When displaying a new image in a surrounding of the frame member, the image display device displays the new image from an edge of the frame member in a slide-in manner.

13 Claims, 13 Drawing Sheets

VEHICLE DISPLAY DEVICE AND DISPLAY METHOD THEREOF

CROSS-REFERENCE TO RELATED APPLICATION(S)

The present application claims priority to and incorporates by reference the entire contents of Japanese Patent Application No. 2017-015351 filed in Japan on Jan. 31, 2017.

BACKGROUND OF THE INVENTION

1. Field of the Invention

The present invention relates to a vehicle display device and a display method of the vehicle display device.

2. Description of the Related Art

There have been vehicle display devices each of which includes an image display and a frame member surrounding a part of an image display region in the image display. Japanese Patent Application Laid-open No. 2006-132950 discloses a technique for a vehicle display device including a display separating mechanism that is disposed on a display, surrounds a first display region, and separates the first display region form the other display region.

When a new image is displayed in a surrounding of the frame member, it is preferable that a user can easily recognize the display of the new image.

SUMMARY OF THE INVENTION

It is an object of the present invention to provide a vehicle display device and a display method of a vehicle display device that can cause user to easily be aware of displaying new image.

In order to achieve the above mentioned object, a vehicle display device according to one aspect of the present invention includes an image display device that is disposed in front of a driver in a vehicle and displays an image; and a frame member that is disposed on a driver side of the image display device and surrounds a part of an image display region in the image display device, wherein when displaying a new image in a surrounding of the frame member, the image display device displays the new image from an edge of the frame member in a slide-in manner.

According to another aspect of the present invention, in the vehicle display device, it is preferable that when displaying the new image with a change of a display mode according to operation input, the image display device moves the image being displayed toward the edge of the frame member in a slide-out manner, and displays the new image from the edge of the frame member in a slide-in manner.

According to still another aspect of the present invention, in the vehicle display device, it is preferable that when displaying the new image by interruption display, the image display device displays the new image from the edge of the frame member in a slide-in manner without moving the image being displayed in a slide-out manner.

According to still another aspect of the present invention, in the vehicle display device, it is preferable that the frame member has an arc portion having an arc shape, the image display device displays an image including a frame image as the new image from an edge of the arc portion in a slide-in manner, and a shape of a head of the frame image in a slide-in direction matches with the shape of the arc portion.

According to still another aspect of the present invention, in the vehicle display device, it is preferable that the new image is an image of an alarm display.

According to still another aspect of the present invention, a display method of a vehicle display device includes a display step of displaying a new image in a surrounding of the frame member by the image display device, wherein at the display step, the new image is displayed from an edge of the frame member in a slide-in manner.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENT

The following describes a vehicle display device and a display method of the vehicle display device according to an embodiment of the invention in detail with reference to the accompanying drawings. The embodiment does not limit the invention. The elements of the following embodiment include elements that the persons skilled in the art can easily assume or that are substantially the same as the elements known by those in the art.

Embodiment

Figure 1:
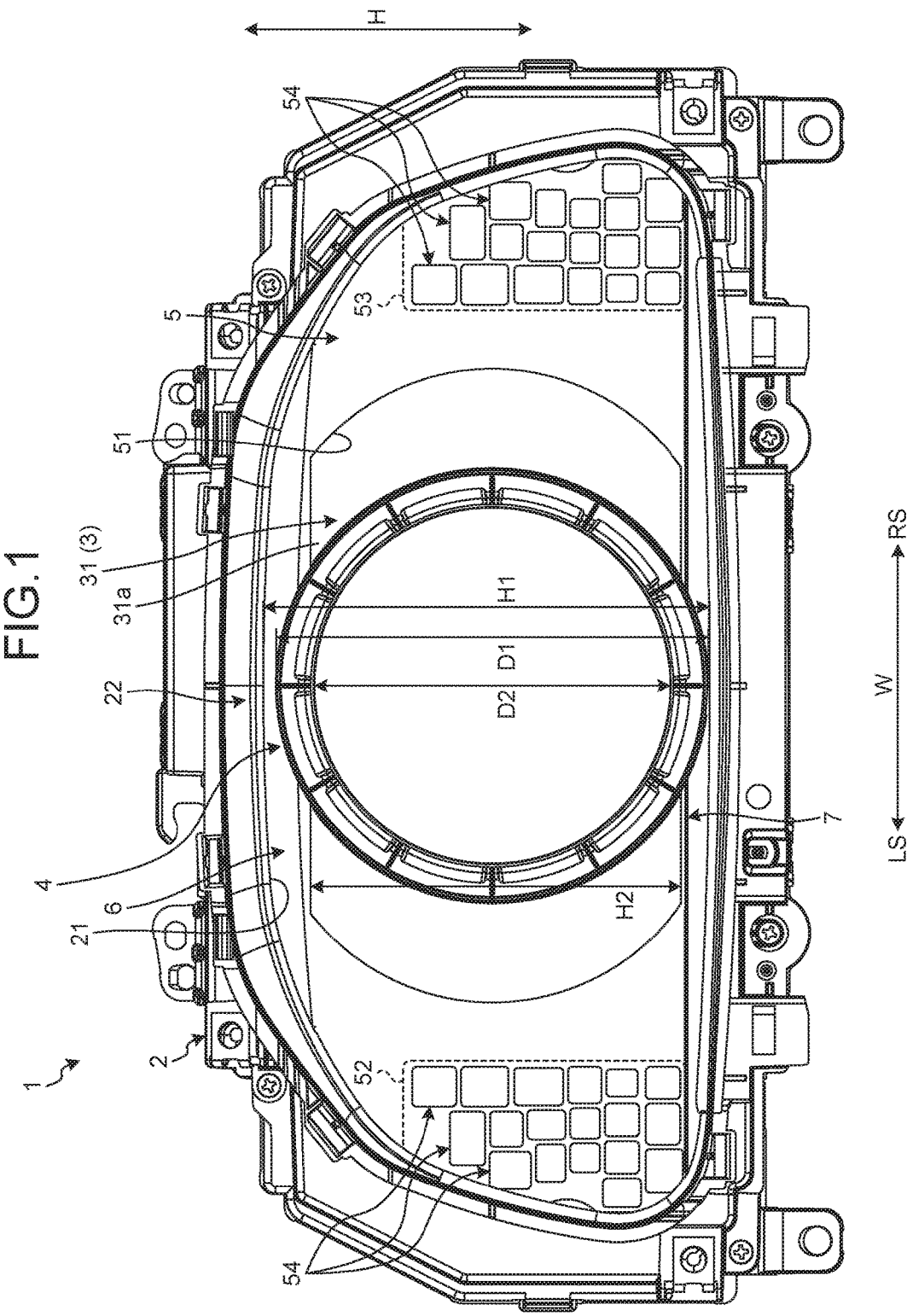
FIG. 1 is a front view of a vehicle display device according to an embodiment.
Figure 2:
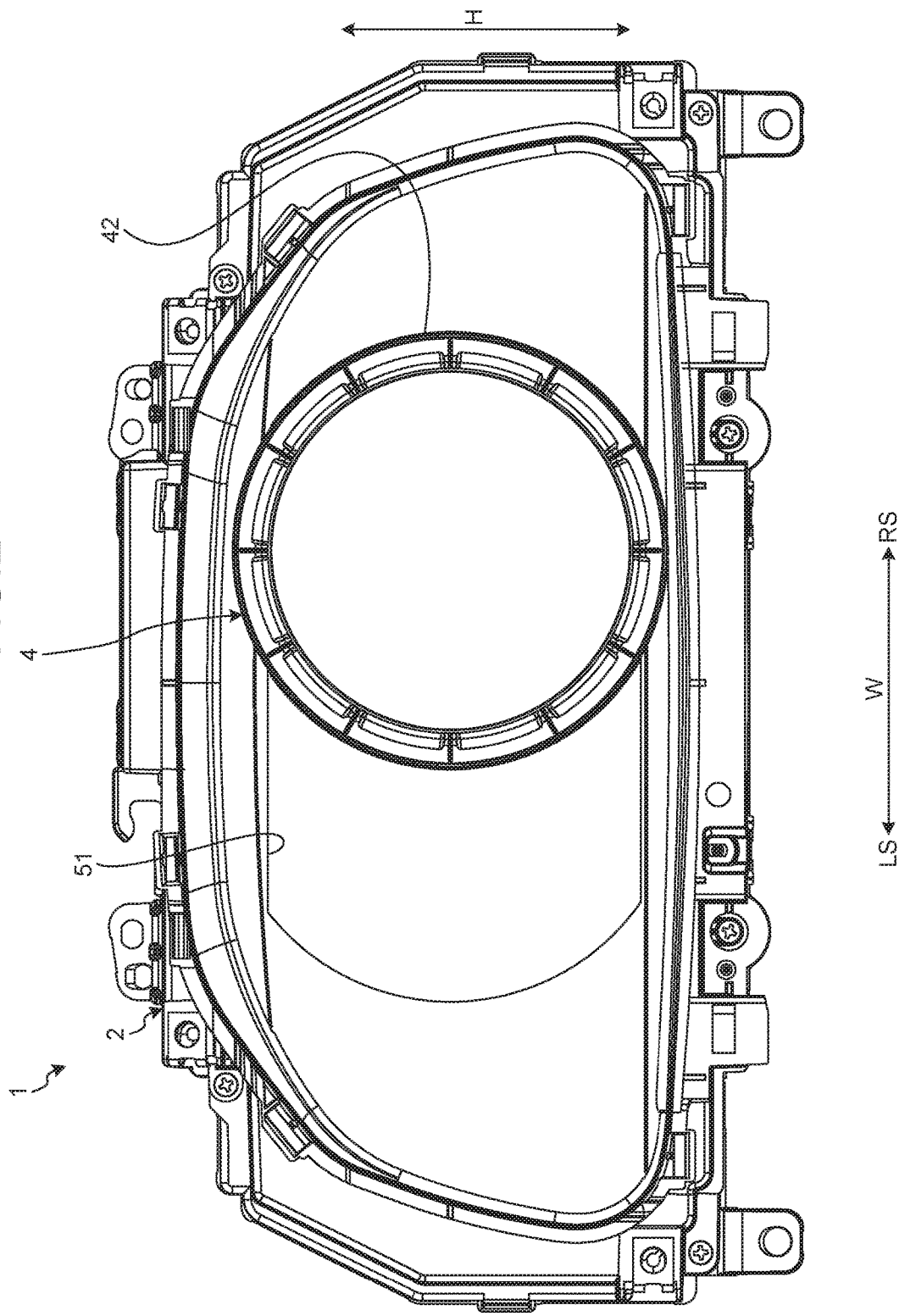
FIG. 2 is a front view illustrating a state where a ring is at a second position in the vehicle display device in the embodiment.
Figure 3:
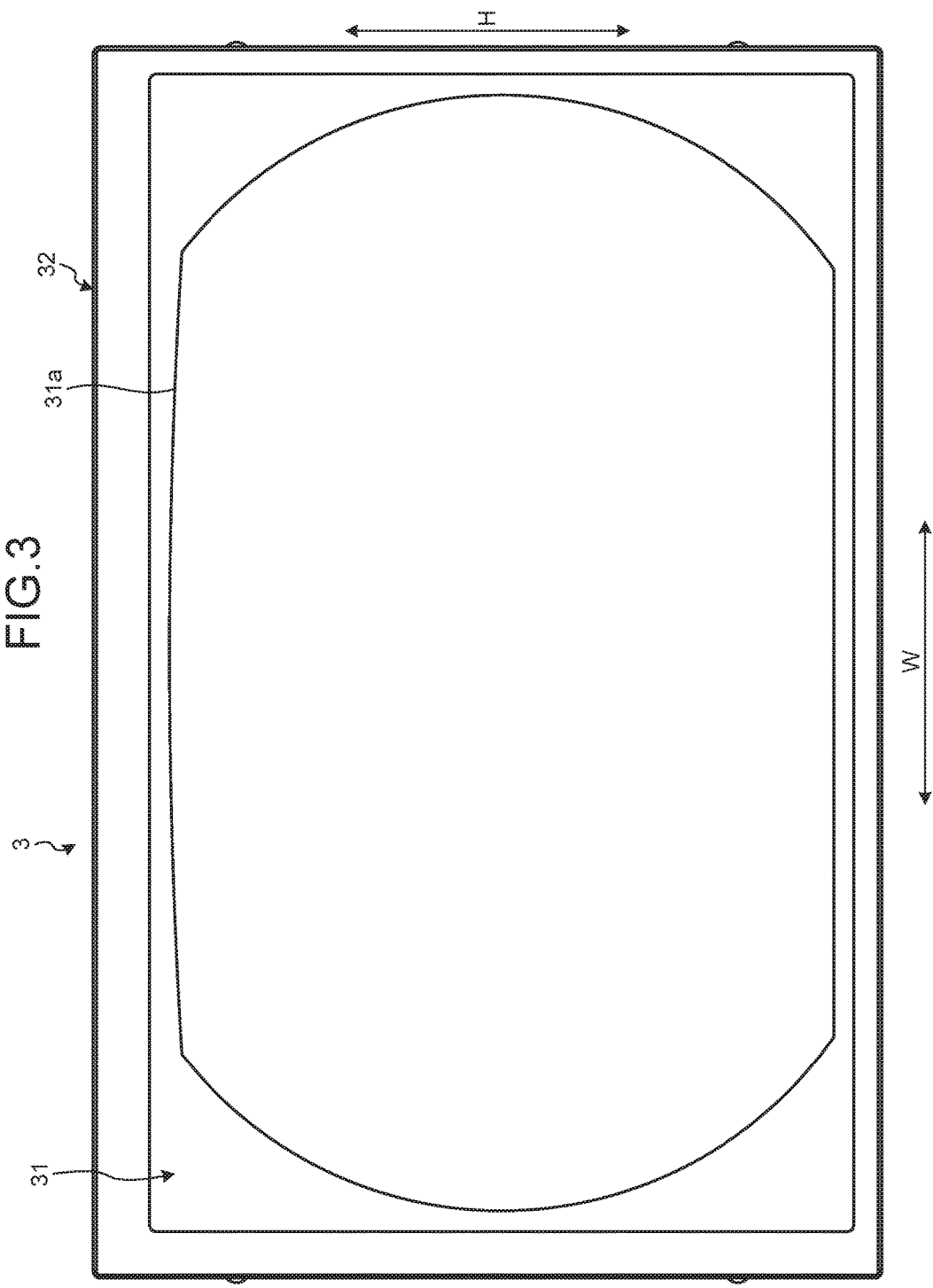
FIG. 3 is a front view of an image display device according to the embodiment.
Figure 4:
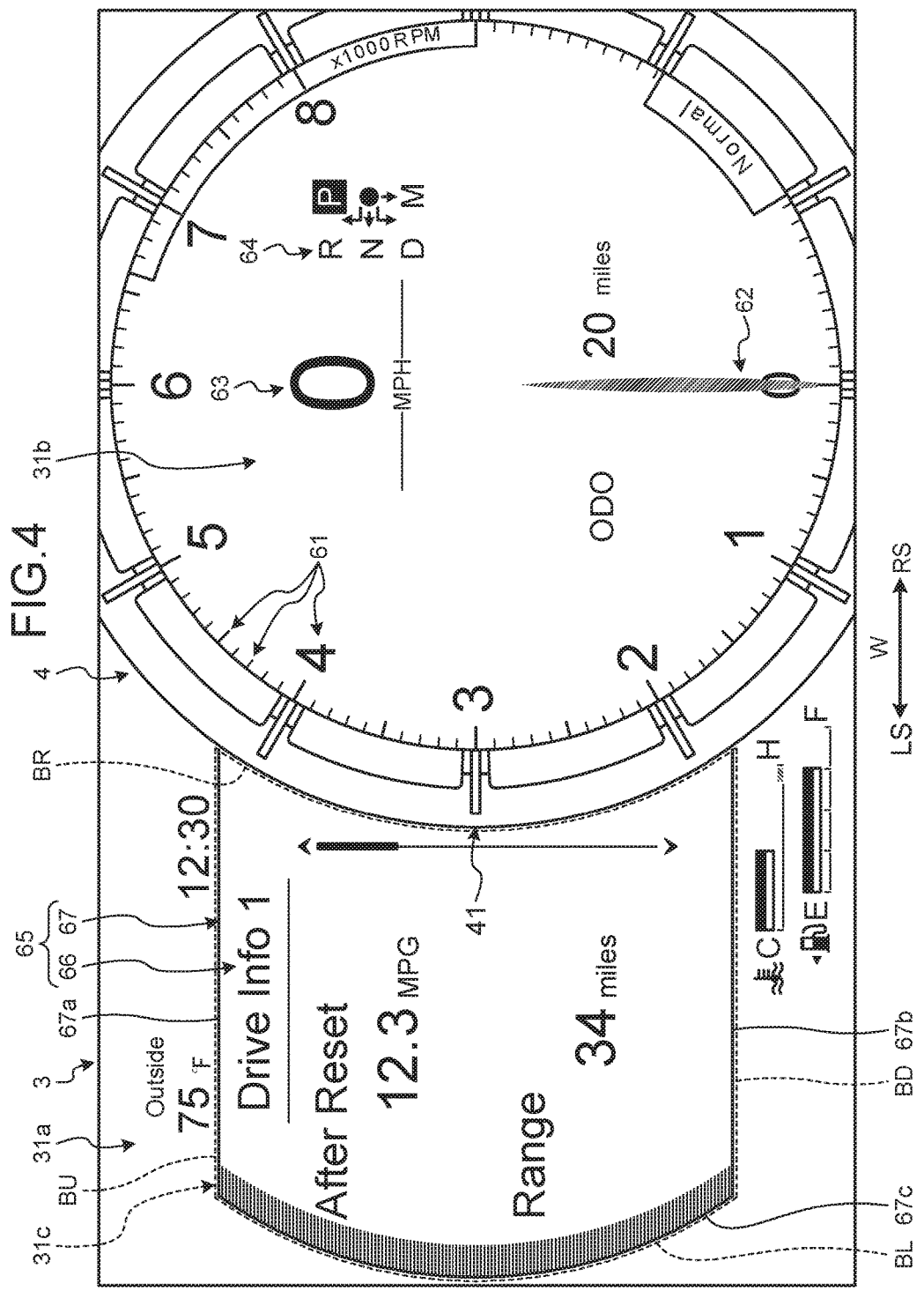
FIG. 4 is a front view illustrating an example of a display image in the image display device in the embodiment.
Figure 5:
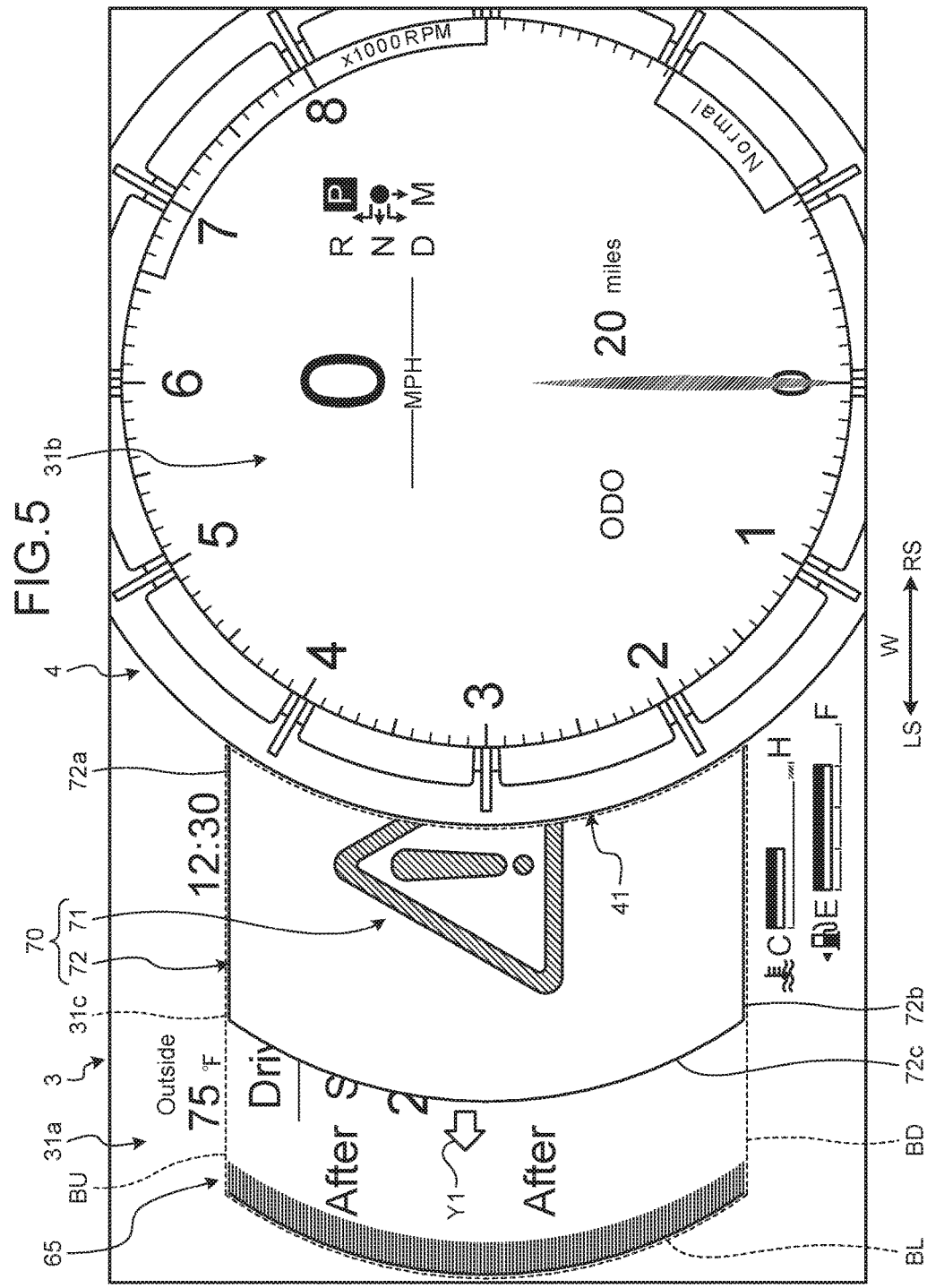
FIG. 5 is an explanatory view of a slide-in display in the image display device in the embodiment.
Figure 6:
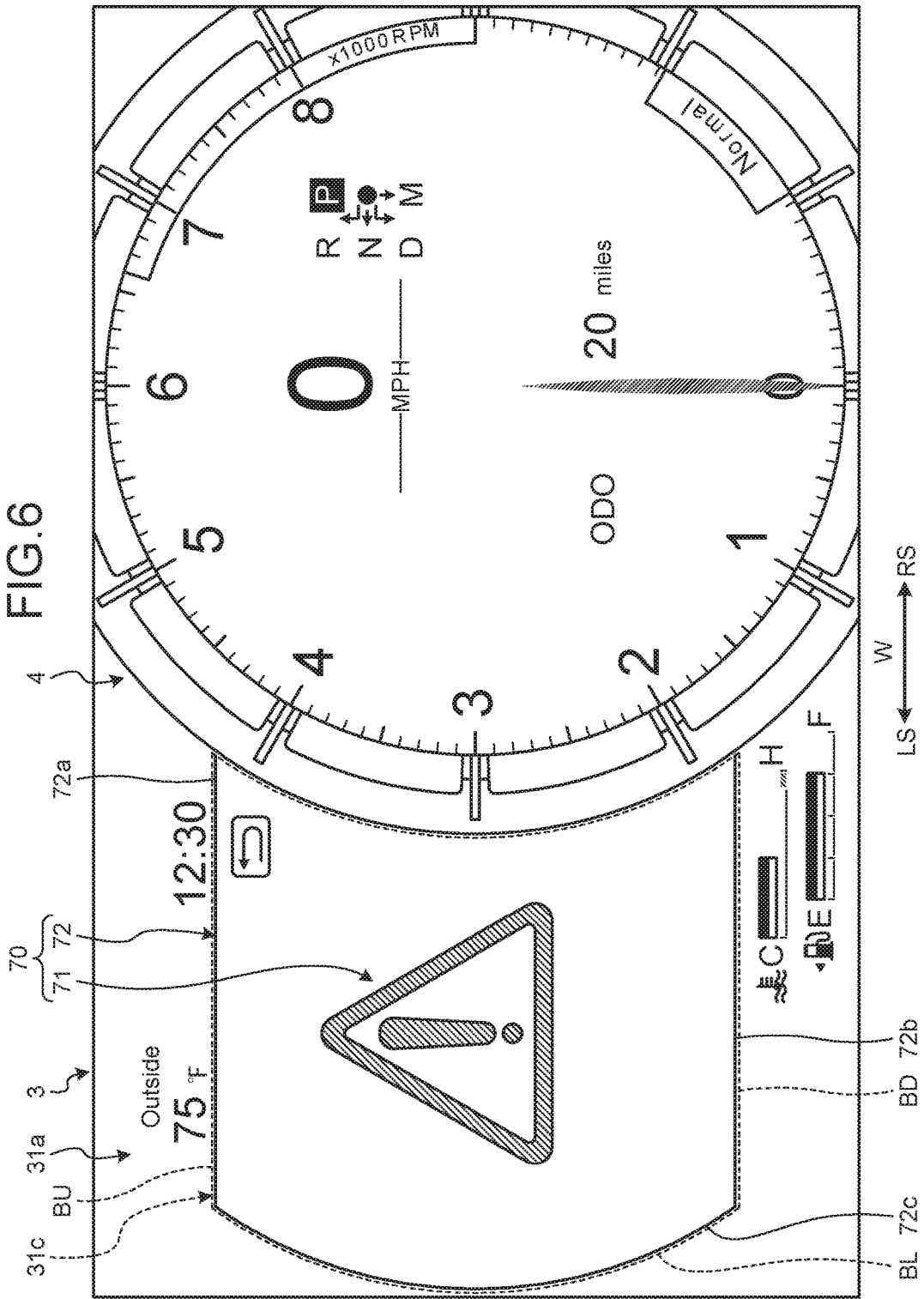
FIG. 6 is a schematic diagram illustrating a state where the slide-in display is completed in the image display device in the embodiment.

The embodiment is described with reference to FIGS. 1 to 13. The embodiment relates to a vehicle display device and a display method of the vehicle display device. FIG. 1 is a front view of the vehicle display device according to the embodiment. FIG. 2 is a front view illustrating a state where a ring is at a second position in the vehicle display device in the embodiment. FIG. 3 is a front view of an image display device according to the embodiment. FIG. 4 is a front view illustrating an example of a display image in the image display device in the embodiment. FIG. 5 is an explanatory view of a slide-in display in the image display device in the embodiment. FIG. 6 is a schematic diagram illustrating a state where the slide-in display is completed in the image display device in the embodiment.

As illustrated in FIG. 1, a vehicle display device 1 according to the embodiment includes a housing 2, an image display device 3, a ring 4, and a dial plate 5. The vehicle display device 1 in the embodiment has a display function of a vehicle meter device. The vehicle display device 1 is disposed in front of a driver of a vehicle. For example, the vehicle display device 1 is disposed in an instrument panel.

The housing 2 accommodates and holds members and devices that include the image display device 3, the ring 4, and the dial plate 5. The housing 2 has an opening 21. The housing 2 is disposed such that the opening 21 faces a driver side. In other words, the housing 2 is disposed to face the backward of the vehicle. In the following description of the vehicle display device 1, a backward side in a forward-backward direction of the vehicle is described as a "front side" of the vehicle display device 1 while a forward side in the forward-backward direction of the vehicle is described as a "rear side" of the vehicle display device 1. The vehicle display device 1 is disposed in such a manner that the front side of the vehicle display device 1 faces the driver. The driver views the image display device 3, the ring 4, and the dial plate 5 through the opening 21.

As illustrated in FIG. 1, the shape of the housing 2 when viewed from the front thereof is a rectangular shape in which a length in a vehicle width direction W is longer than a length in a vehicle up-down direction H. The housing 2 is formed of a metal or a synthetic resin, for example. The housing 2 is provided with a facing portion 22 on the front surface thereof in such a manner that the facing portion 22 protrudes to the front side over the opening 21. The facing portion 22 has a tubular shape and is integrally formed with a main body of the housing 2. The front side of the facing portion 22 is covered with a transparent cover.

The dial plate 5, which is a member having a plate shape, is disposed such that the dial plate 5 covers the opening 21 on the rear side. The dial plate 5 is formed of a synthetic resin, for example. The dial plate 5 is fixed to the housing 2. The dial plate 5 has a window 51 at the central portion thereof. The window 51 transmits light. The window 51 may be a through hole passing through the dial plate 5 or a region that is provided in the dial plate 5 and has transparency. The shape of the window 51 is an oblong shape in which a length in the vehicle width direction W is longer than a length in the vehicle up-down direction H. The window 51 in the embodiment has a shape formed in such a manner that each of the short sides of the rectangular shape bulges in the vehicle width direction W in an arc shape. The shape of the arc portion of the window 51 matches with the shape of the ring 4.

On both sides of the window 51 in the vehicle width direction W, display design regions 52 and 53 are provided. The display design region 52 is disposed on one side of the window 51 in the vehicle width direction W while the display design region 53 is disposed on the other side of the window 51 in the vehicle width direction W. In each of the display design regions 52 and 53, a plurality of display designs 54 are arranged. The display designs 54 are graphics and characters that indicate various types of information about the vehicle. The display designs 54 are blanked-out printed regions having transparency on the dial plate 5, for example. On the rear side of the display design regions 52 and 53, light sources are arranged corresponding to the respective display designs 54. The display designs 54 display characters and graphics when the corresponding respective light sources are turned on.

The image display device 3 is disposed on the rear side of the dial plate 5. The image display device 3 in the embodiment is a liquid crystal display such as a thin film transistor-liquid crystal display (TFT-LCD). As illustrated in FIG. 3, the image display device 3 has a liquid crystal display unit 31 and a frame member 32. The frame member 32 surrounds the edge of the liquid crystal display unit 31 to support the liquid crystal display unit 31.

The image display device 3 is disposed in such a manner that the liquid crystal display unit 31 faces the front side. On the rear side of the liquid crystal display unit 31, a back light unit is disposed. The image display device 3 includes a control unit that controls the liquid crystal display unit 31 and the back light unit. The liquid crystal display unit 31 displays any image in accordance with a command from the control unit. The image displayed on the liquid crystal display unit 31 is projected to the front side by light emitted by the back light unit.

The size of the window 51 of the dial plate 5 is smaller than the size of the liquid crystal display unit 31. The window 51 faces a main portion of the liquid crystal display unit 31. The main portion of the liquid crystal display unit 31 can be viewed from the driver side through the window 51. The dial plate 5 blocks, by the portion surrounding the window 51, the edge portion of the liquid crystal display unit 31 and the frame member 32 holding the liquid crystal display unit 31 from being viewed from the driver side. The region corresponding to the window 51 in the liquid crystal display unit 31 is described as an "image display region 31a" (refer to FIG. 3). The image display region 31a, in which various images are displayed, can be viewed from the driver side.

Referring back to FIG. 1, the ring 4 is a member disposed on the front side of the dial plate 5. The shape of the ring 4 in the embodiment is a circular ring shape. An outer diameter D1 of the ring 4 is slightly smaller than a maximum width H1 in the vehicle up-down direction H of the opening 21. An inner diameter D2 of the ring 4 is smaller than a width H2 in the vehicle up-down direction H of the window 51. The upper end of the ring 4 is positioned at a higher position on the vehicle's upper side than the upper end of the window 51 while the lower end of the ring 4 is positioned at a lower position on the vehicle's lower side than the lower end of the window 51.

The ring 4 in the embodiment can be moved relative to the dial plate 5 in the vehicle width direction W. More specifically, the upper end portion of the ring 4 is coupled to a drive mechanism with an upper side holding member, which is not illustrated, interposed therebetween. The upper side holding member is blocked by a cover member 6 attached to the housing 2 from being viewed from the driver side. The drive mechanism, which includes a motor and gears, converts rotation torque generated by the motor into drive force in the vehicle width direction W, and transmits the drive force to the ring 4. The drive mechanism moves the ring 4 to a left side LS or a right side RS in the vehicle width direction W by changing a rotation direction of the motor.

The lower end portion of the ring 4 is coupled to a guide portion with a lower side holding member, which is not illustrated, interposed therebetween. The lower side holding member is blocked by a cover member 7 attached to the housing 2 from being viewed from the driver side. The guide portion is a guide rail extending along the vehicle width direction W, for example. The guide portion defines a movable range of the ring 4 in the vehicle width direction W. The ring 4 in the embodiment is movable in the vehicle width direction W between a first position illustrated in FIG. 1 and a second position illustrated in FIG. 2. The first position is the most left position on the vehicle left side LS in the movable range of the ring 4. The second position is the most right position on the vehicle right side RS in the movable range of the ring 4.

The first position in the embodiment is the central position in the vehicle width direction W in the opening 21. The first position is also the central position in the vehicle width direction W in the window 51. The second position in the embodiment is the position near the end of the opening 21 on the vehicle right side RS. The second position is at the end of the window 51 on the vehicle right side RS. More specifically, as illustrated in FIG. 2, a right end portion 42 of the ring 4 at the second position overlaps with the right end portion of the window 51.

FIG. 4 illustrates an example of the position of a display image when the ring 4 is at the second position. As illustrated in FIG. 4, the image display device 3 displays, in the image display region 31a, scale images 61, an indicator image 62, a vehicle speed image 63, and a shift position image 64, for example. The image display device 3 displays the images 61, 62, 63, and 64 on an inside region 31b, which is the region inside the ring 4. The inside region 31b is a part of the image display region 31a. The position of the inside region 31b may be changed in accordance with the movement of the ring 4 along the vehicle width direction W. The position of the inside region 31b is not limited to that described above. The position of the inside region 31b may be a position surrounded by the ring 4 when the ring 4 is at the first position or the second position.

The scale images 61 are displayed as indicators of a physical amount corresponding to an output speed of a drive source mounted on the vehicle. In the embodiment, the drive source is an engine while the physical amount corresponding to the output speed is an engine rotation speed (in rotation per minute (RPM)). The indicator image 62 is displayed as an indicator indicating a current value of the engine rotation speed. More specifically, the indicator image 62 is displayed such that the indicator image 62 indicates the scale image 61 at a position corresponding to the current engine rotation speed out of the multiple scale images 61 arranged along a circumferential direction.

The vehicle speed image 63 is an image of a number indicating a current running speed of the vehicle. The vehicle speed image 63 is displayed at an upper position in an image up-down direction relative to the center of the inside region 31b. The shift position image 64 is an image indicating a current shift position. The shift position image 64 is displayed on the right side of the vehicle speed image 63 in an image lateral direction.

The image display device 3 displays a traveling information image 65 in an information display region 31c provided outside the ring 4. Various types of information are displayed in the information display region 31c when the ring 4 is at the second position. The information display region 31c is on the left side LS in the vehicle width direction W of the ring 4 at the second position. A border line BU at the upper end of the information display region 31c and a border line BD at the lower end of the information display region 31c are straight lines extending in the vehicle width direction W. In other words, they are straight lines extending in the image lateral direction. A border line BL at the left end of the information display region 31c has an arc shape curved to the left side LS. A border line BR at the right end of the information display region 31c has an arc shape curved to the left side LS. The border line BR at the right end matches with the outer circumference of a left end portion 41 of the ring 4.

The shape of the border line BL at the left end and the shape of the border line BR at the right end match with the arc shape of the outer circumference of the ring 4. In the embodiment, the radius of the arc shape of each of the border line BL at the left end and the border line BR at the right end is equal to the radius of the arc shape of the outer circumference of the left end portion 41 of the ring 4.

The traveling information image 65 includes an information content image 66 and a frame image 67. The information content image 66 is an image of characters and graphics that indicate contents of information. The information content image 66 illustrated in FIG. 4 includes a number indicating a running distance in miles accumulated up to now, and a number indicating a current fuel economy in miles per gallon (MPG).

The frame image 67 is an image that has a frame shape and surrounds the information content image 66. The frame image 67 is an image that has a linear shape along the border lines BU, BL, and BD of the information display region 31c. The frame image 67 has an upper border 67a, a lower border 67b, and a side border 67c. The upper border 67a has a straight line shape along the border line BU at the upper end. The lower border 67b has a straight line shape along the border line BD at the lower end. The side border 67c has an arc shape along the border line BL at the left end. The upper end of the side border 67c is connected to the upper border 67a while the lower end of the side border 67c is connected to the lower border 67b.

The image display device 3 in the embodiment displays a new image from the edge of the ring 4 in a slide-in manner when displaying the new image in a surrounding of the ring 4. The following describes an image display method with reference to FIGS. 5 to 9. The image display method is described with reference to FIGS. 5 to 7 when the image display device 3 displays a new image by interruption display. The interruption display is processing to display an image by interruption processing when an alarm is emitted or operation is input. In other words, the interruption display is display processing to display an image having a higher priority by overlaying the image on the image being displayed.

When an alarm is emitted, the image display device 3 displays an alarm image 70 from the edge of the ring 4 in a slide-in manner as illustrated in FIG. 5. The alarm image 70 includes an alarm content image 71 and a frame image 72. The alarm content image 71 is an image of at least one of graphics and characters that indicate a content of the alarm. The frame image 72 is an image that has a frame shape and surrounds the alarm content image 71. The frame image 72 has an upper border 72a, a lower border 72b, and a side border 72c. The upper border 72a has a straight line shape along the border line BU at the upper end. The lower border 72b has a straight line shape along the border line BD at the lower end. The side border 72c has an arc shape. The upper end of the side border 72c is connected to the upper border 72a while the lower end of the side border 72c is connected to the lower border 72b.

The shape of the side border 72c matches with the arc shape of the outer circumference of the ring 4. In the embodiment, the radius of the arc shape of the side border 72c is equal to the radius of the arc shape of the outer circumference of the left end portion 41 of the ring 4. The radius of the arc shape of the side border 72c is, thus, also equal to the radius of the arc shape of the border line BL at the left end.

The image display device 3 displays the alarm image 70 in a slide-in manner such that the alarm image 70 overlays the traveling information image 65. The slide-in direction, which is indicated with arrow Y1, is from the outer circumference of the left end portion 41 of the ring 4 to the outside of the ring 4 along a radius direction thereof. In other words, the image display device 3 displays the alarm image 70 in a slide-in manner from the edge of the ring 4 toward the left side LS in the vehicle width direction W.

FIG. 6 illustrates a state where the slide-in display of the alarm image 70 is completed. The image display device 3 ends the slide-in display when the side border 72c of the alarm image 70 reaches the border line BL at the left end.

Figure 7:
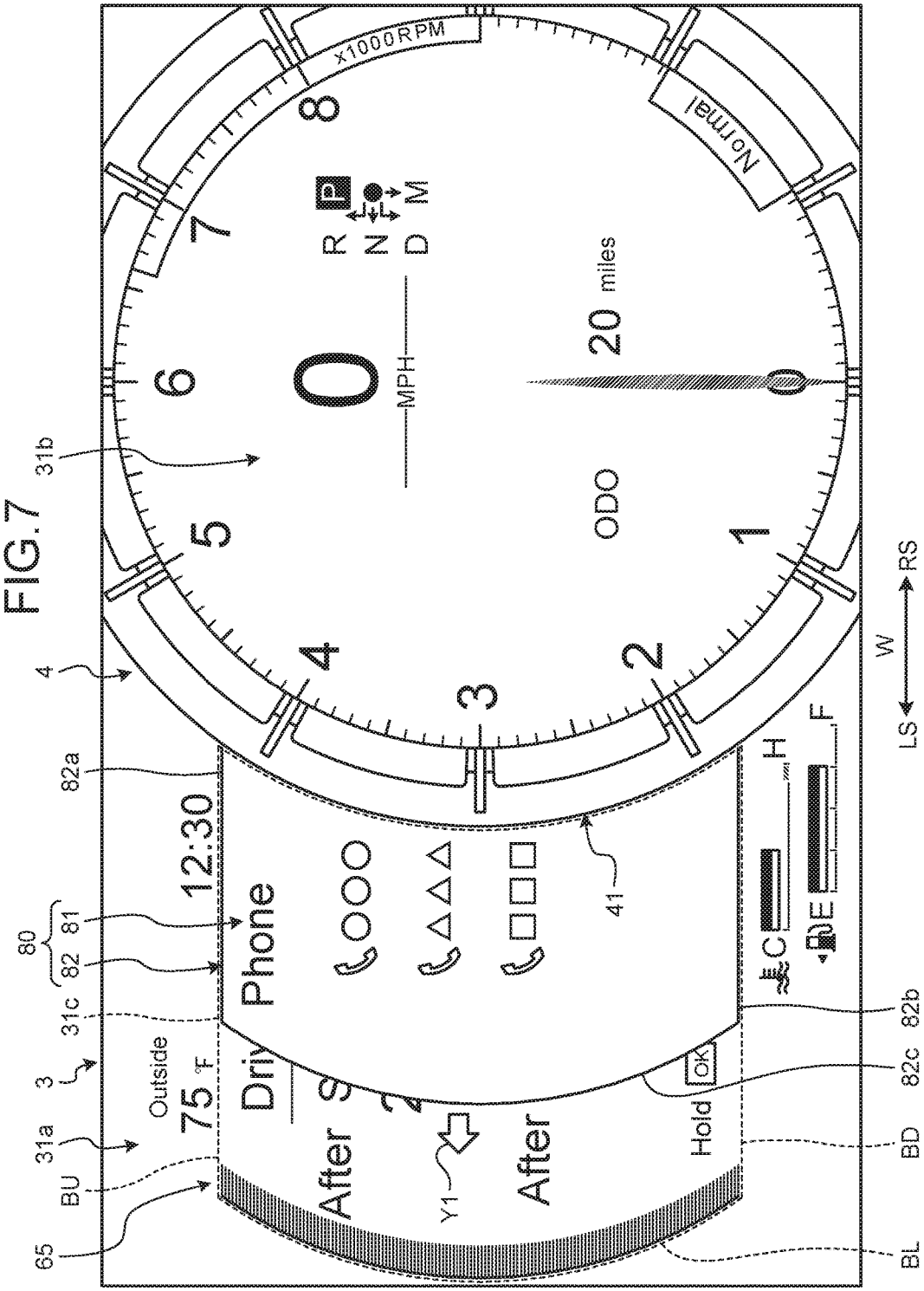
FIG. 7 is a schematic diagram illustrating the slide-in display of another image in the image display device in the embodiment.

When performing the interruption display in accordance with operation input, the image display device 3 displays an image in the same slide-in manner as the alarm display. As illustrated in FIG. 7, the image display device 3 displays a new image (hereinafter, simply described as an "interruption image") 80 in accordance with the interruption processing in a slide-in manner. The interruption image 80 is displayed in accordance with a calling operation performed by a person on board, for example. The interruption image 80 includes an interruption content image 81 and a frame image 82. The interruption content image 81 is an image of contents displayed by the interruption processing. The frame image 82 is an image that has a frame shape and surrounds the interruption content image 81. The frame image 82 has an upper border 82a, a lower border 82b, and a side border 82c. The upper border 82a has a straight line shape along the border line BU at the upper end. The lower border 82b has a straight line shape along the border line BD at the lower end. The side border 82c has an arc shape. The upper end of the side border 82c is connected to the upper border 82a while the lower end of the side border 82c is connected to the lower border 82b.

The shape of the side border 82c matches with the arc shape of the outer circumference of the ring 4. In the embodiment, the radius of the arc shape of the side border 82c is equal to the radius of the arc shape of the outer circumference of the left end portion 41 of the ring 4. The radius of the arc shape of the side border 82c is, thus, also equal to the radius of the arc shape of the border line BL at the left end.

The image display device 3 displays the interruption image 80 in a slide-in manner such that the interruption image 80 overlays the traveling information image 65. The image display device 3 ends the slide-in display when the side border 82c reaches the border line BL at the left end.

The image display device 3 in the embodiment performs animation display in an inverse manner to that at the start of the interruption display when ending the interruption display. For example, when ending the display of the alarm image 70, the image display device 3 slides the alarm image 70 toward the left end portion 41 of the ring 4. In other words, the alarm image 70 is moved in a slide-out manner. The disappearance of the image of the interruption display in an inverse manner to that at the start of the interruption display allows a user to easily recognize the end of the interruption display. For example, the disappearance of the alarm image 70 in a slide-out manner makes it possible to convey, to the user (typically, the driver), that the state of the vehicle is transited from an alarm state to a normal state in a comprehensible way.

Figure 8:
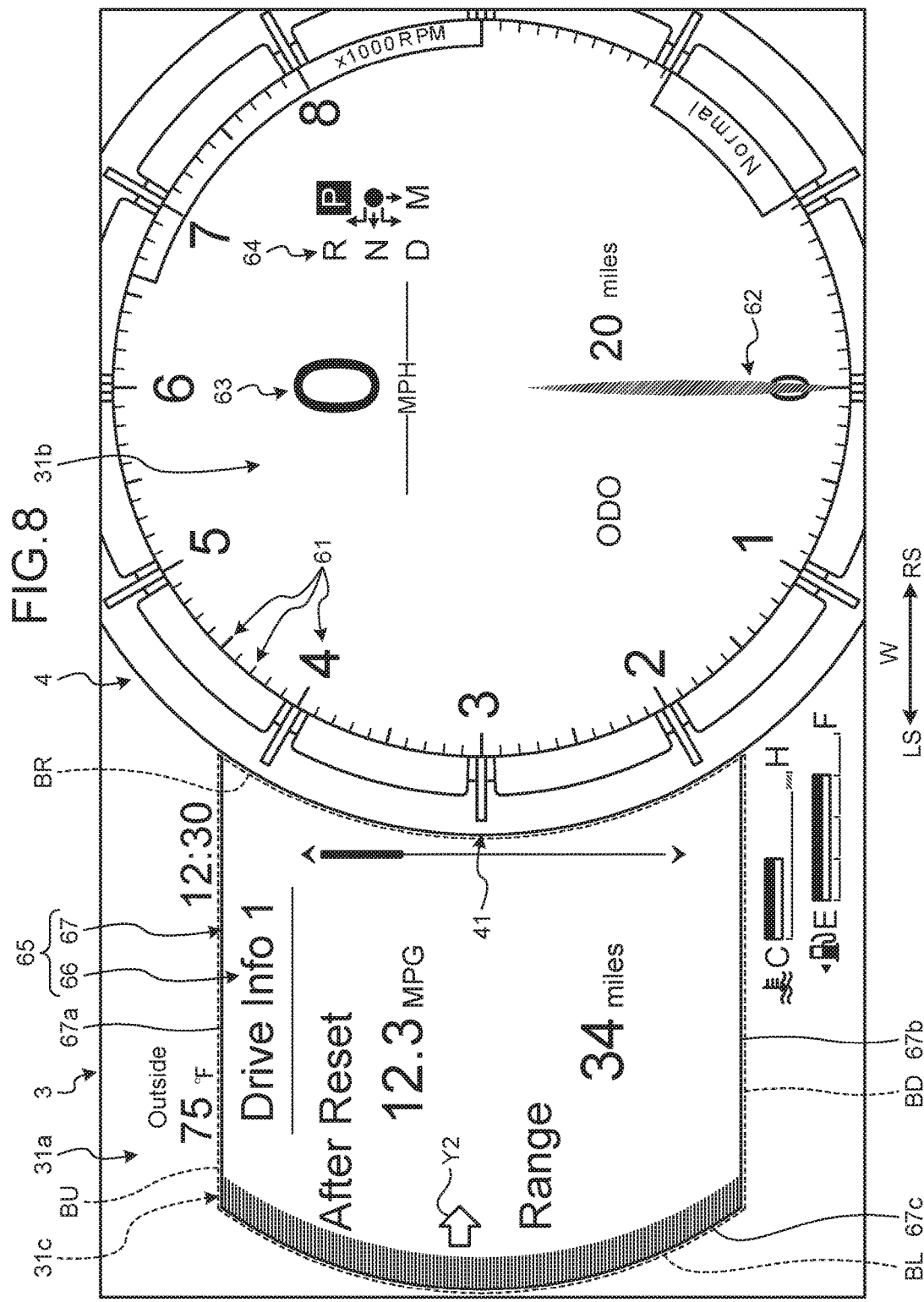
FIG. 8 is an explanatory view of slide-out movement in the image display device in the embodiment.
Figure 9:
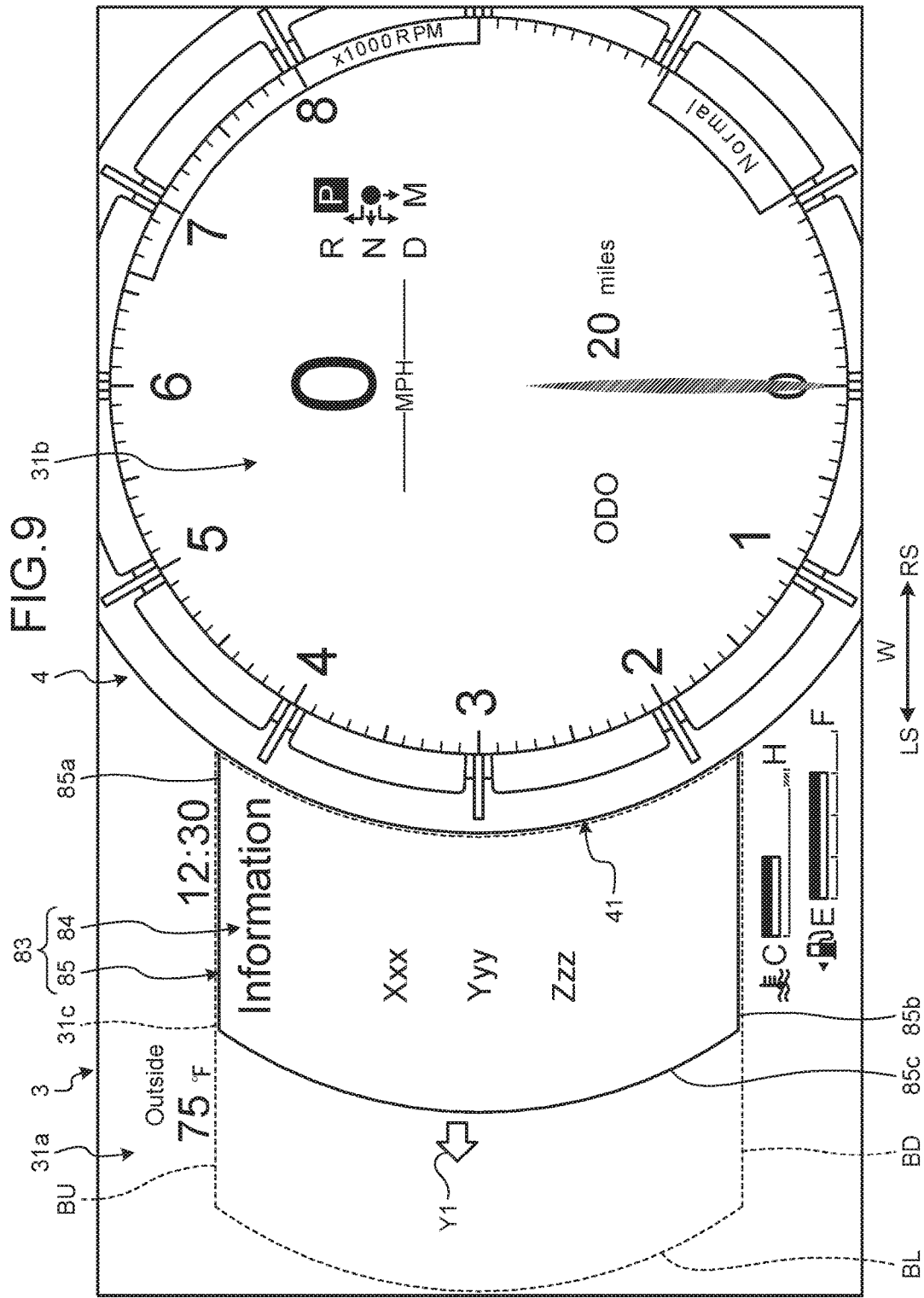
FIG. 9 is a schematic diagram illustrating a change of a display mode in the image display device in the embodiment.

The following describes displaying of a new image with a change of a display mode according to operation input with reference to FIGS. 8 and 9. Examples of the operation input include button operation and touch operation performed by the driver. In the display mode before the operation input is performed, the traveling information image 65 is displayed. With the change of the display mode according to the operation input, the image display device 3 displays a second information image 83 illustrated in FIG. 9 instead of the traveling information image 65.

As illustrated in FIG. 8, the image display device 3 moves the traveling information image 65, which is the image being displayed, toward the edge of the ring 4 in a slide-out manner when changing the display mode displayed in the information display region 31c in accordance with the operation input. The image display device 3 causes the traveling information image 65 to disappear by being slid toward the right side RS in the vehicle width direction W as indicated with arrow Y2. The position at which the image disappears as a result of the slide-out movement is the border line BR at the right end of the information display region 31c. The slide-out movement has such a stage effect that the traveling information image 65 seems to be housed behind the ring 4.

Once completing the slide-out movement of the traveling information image 65, the image display device 3 displays the second information image 83 in a slide-in manner. The second information image 83 includes an information content image 84 and a frame image 85. The information content image 84 is an image of characters and graphics that indicate information provided in the display mode after the change. The frame image 85 has the same structure as the frame images 72 and 82. The frame image 85 has an upper border 85a, a lower border 85b, and a side border 85c. The image display device 3 displays the second information image 83 in a slide-in manner from the edge of the ring 4 as illustrated with arrow Y1.

The timing at which the slide-in display of the second information image 83 starts may be after the completion of the slide-out movement of the traveling information image 65, at the same time when the slide-out movement is completed, during the slide-out movement, or at the start of the slide-out movement. When the traveling information image 65 and the second information image 83 overlap with each other in any of the cases described above, the second information image 83 is displayed in the overlapping region.

Figure 10:
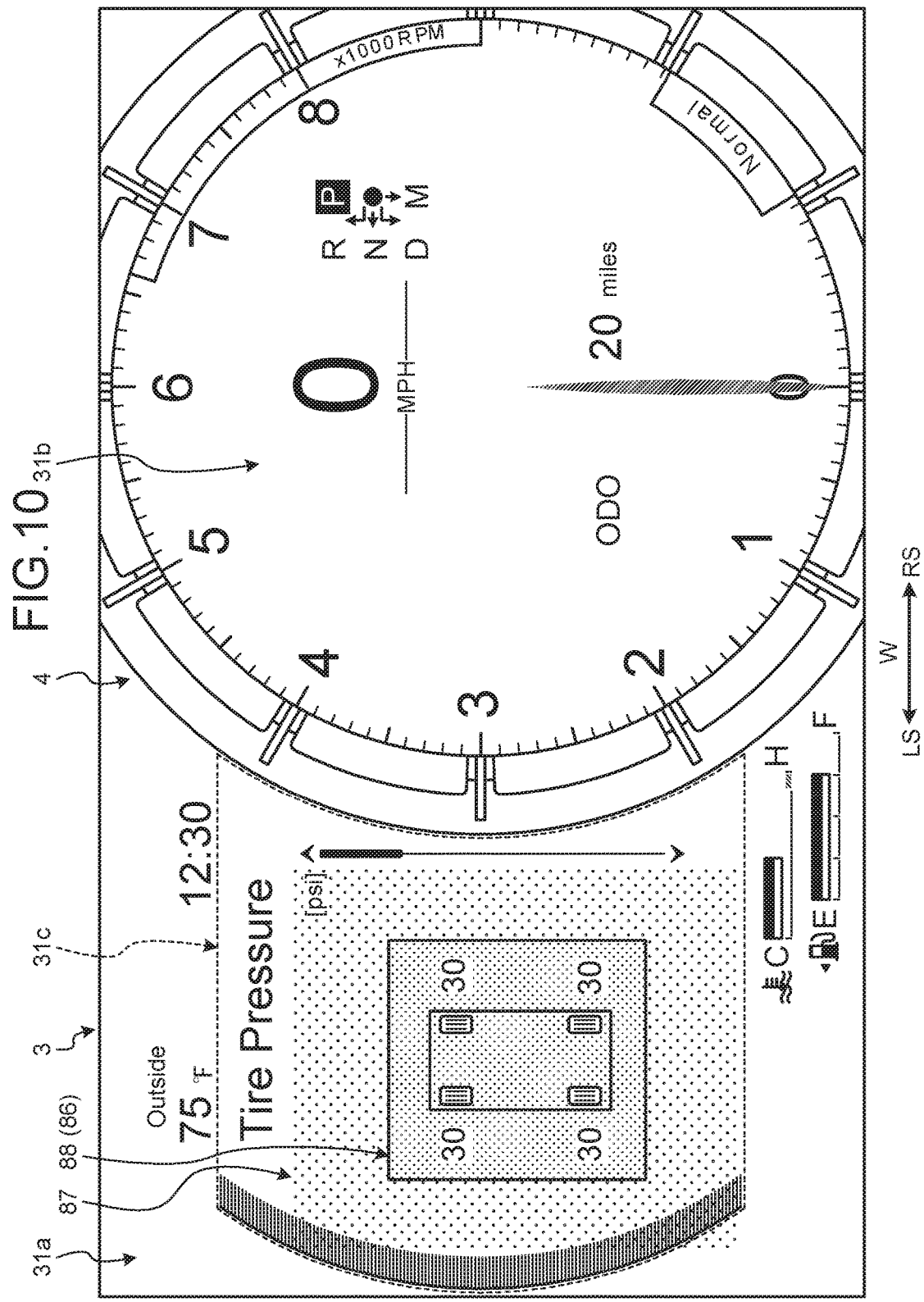
FIG. 10 is a schematic diagram illustrating a tire information image in a normal state in the image display device in the embodiment.
Figure 11:
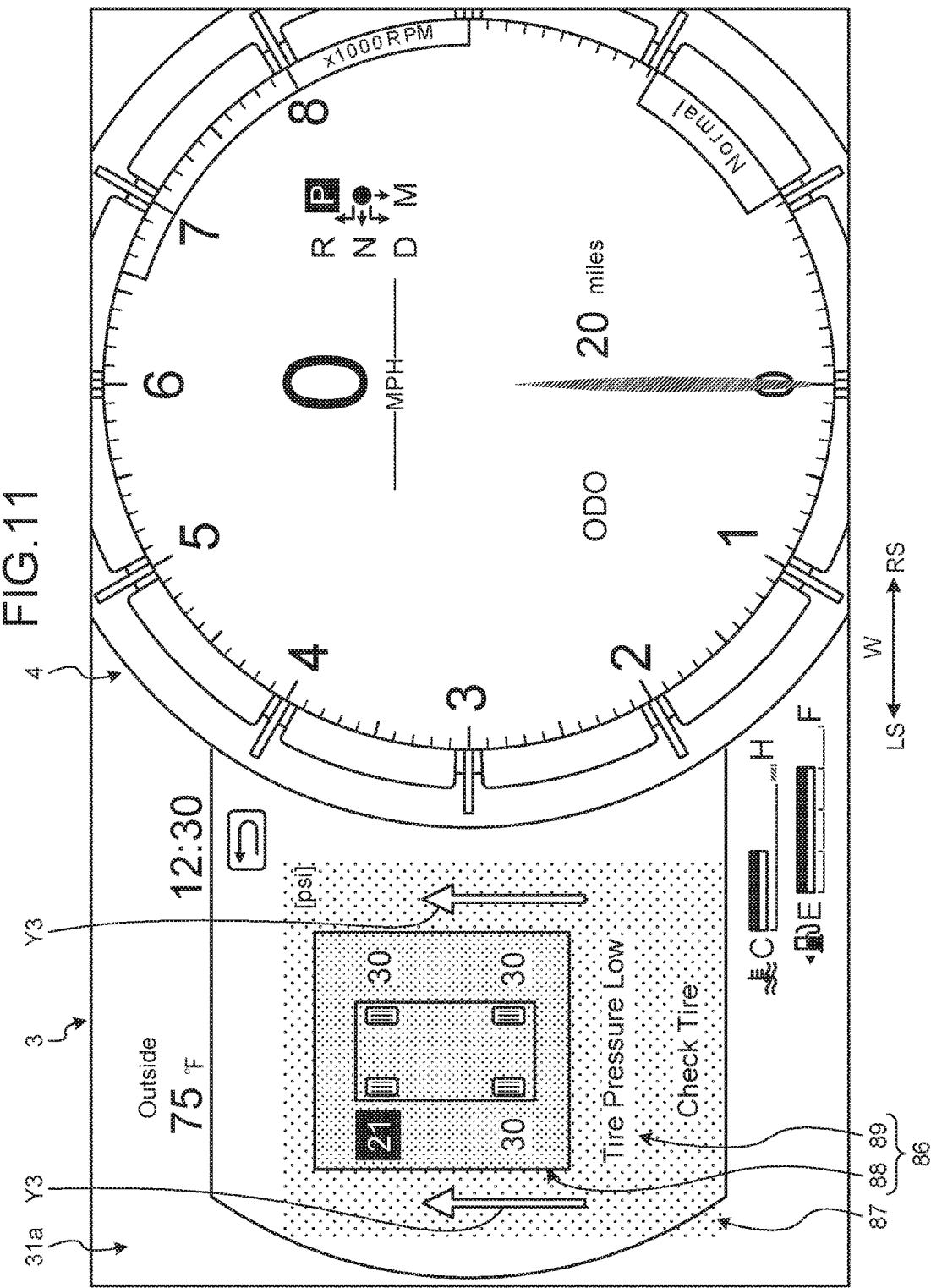
FIG. 11 is a schematic diagram illustrating the tire information image in an abnormal state in the image display device in the embodiment.

As illustrated in FIGS. 10 and 11, the image display device 3 in the embodiment displays information about tire air pressure. FIG. 10 illustrates a tire information image 86 when no abnormality is present in air pressure. FIG. 11 illustrates the tire information image 86 when an abnormality is present in air pressure. The tire information image 86 displays the air pressure of each of the tires of the vehicle, and further displays an alarm when an abnormality is present in the air pressure.

The tire information image 86 is displayed in an information area 87 that has been set preliminarily. The tire information image 86 includes a pressure information image 88. The pressure information image 88, which has a rectangular shape, includes characters indicating the air pressure of each tire of the vehicle. The information area 87 in the embodiment is a region having a rectangular shape. The information area 87 is set in the information display region 31c, for example. The tire information image 86 may be displayed by the interruption display in accordance with operation input or in accordance with a change of the display mode. As illustrated in FIG. 10, when no abnormality is present in air pressure values, the pressure information image 88 is displayed at the center both in an image height direction and the image lateral direction in the information area 87.

When an abnormality is present in any of the air pressure values, the image display device 3 displays, in the information area 87, an alarm image 89 in addition to the pressure information image 88. The alarm image 89 is displayed on the lower side of the pressure information image 88. When displaying the alarm image 89, the image display device 3 performs animation display in which the pressure information image 88 is moved toward the upper side of the image as illustrated with arrow Y3 in FIG. 11. The movement of the pressure information image 88 to the upper side allows a display space for the alarm image 89 to be set in the information area 87.

The pressure information image 88 is moved in the information area 87 when an alarm is emitted as described above, thereby making a balanced display of the pressure information image 88 and the alarm image 89 possible. For example, when the pressure information image 88 is displayed by being moved to the upper side while the space for displaying the alarm image 89 is maintained in a normal state, the arrangement of the images is unbalanced. As a result, the user may feel uncomfortable. The embodiment can change the position of the pressure information image 88 in accordance with the presence or absence of the alarm display, thereby making a balanced arrangement of the images in the information area 87 possible. The vehicle display device 1 in the embodiment prevents the layout design of the pressure information image 88 in the information area 87, the space of which is limited, from being unnatural, thereby making it possible to convey necessary information correctly to the user (drive) in a comprehensive manner.

Figure 12:
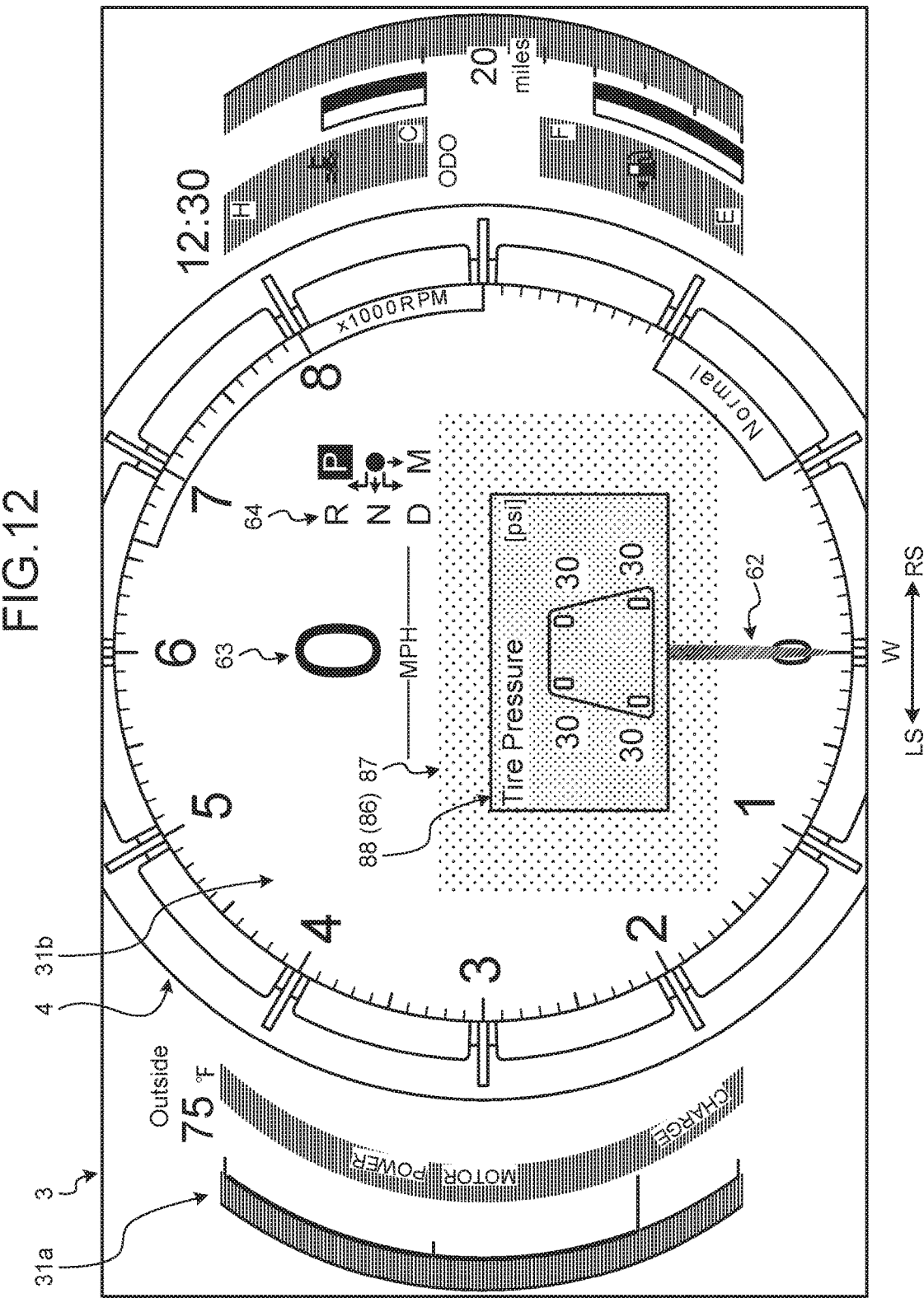
FIG. 12 is another schematic diagram illustrating the tire information image in the normal state in the image display device in the embodiment.
Figure 13:
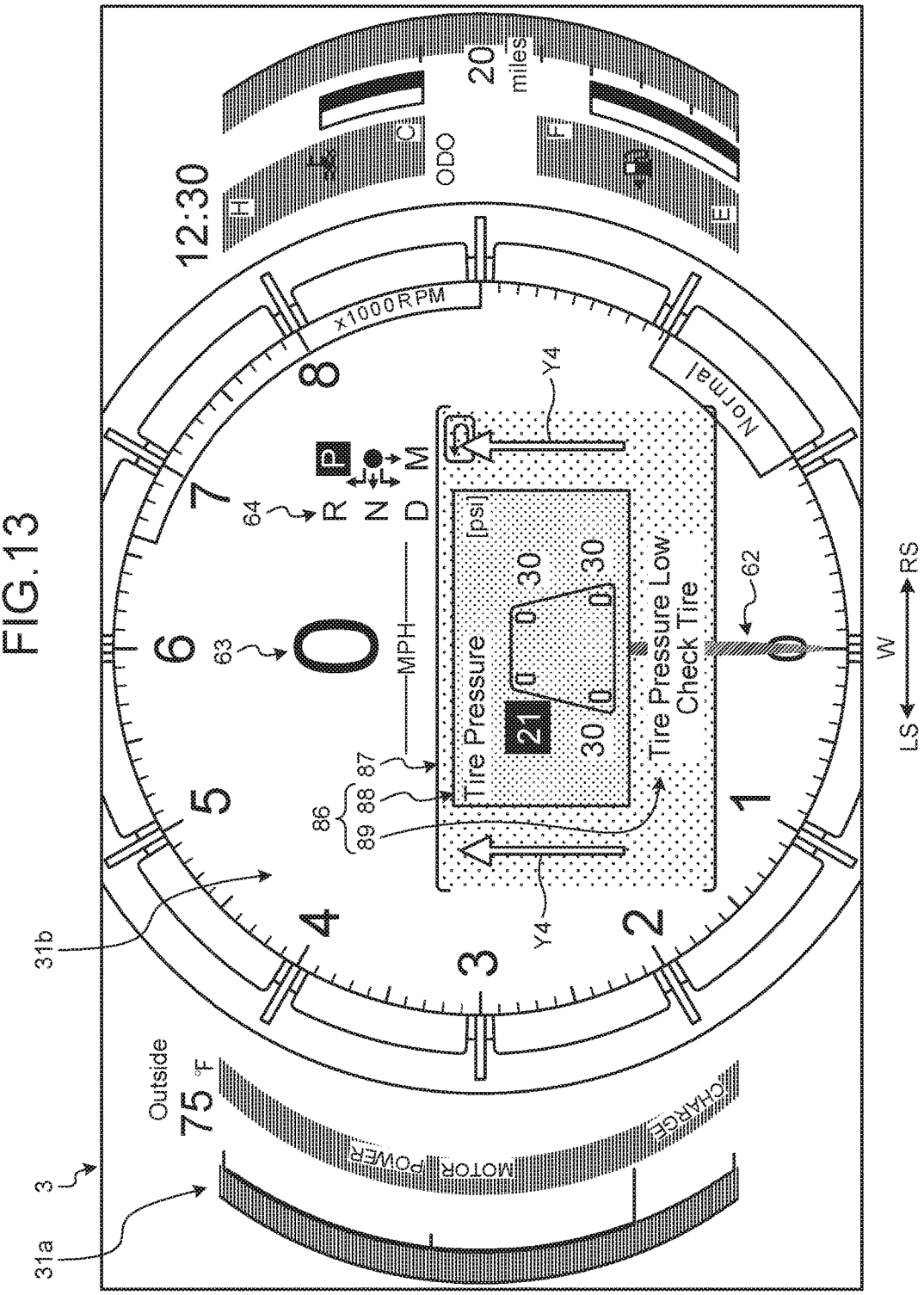
FIG. 13 is another schematic diagram illustrating the tire information image in the abnormal state in the image display device in the embodiment.

As illustrated in FIGS. 12 and 13, the tire information image 86 may be displayed on the inside region 31b. The information area 87 is set at a position in a range from the center to the lower position on the inside region 31b, for example. As illustrated in FIG. 12, when no abnormality is present in the air pressure values, the pressure information image 88 is displayed at the center both in the image height direction and the image lateral direction in the information area 87. When an abnormality is present in any of the tire pressure values, the image display device 3 moves the pressure information image 88 to the upper side as illustrated with arrow Y4 in FIG. 13, and displays the alarm image 89 in the resulting empty region. The number of items displayed in the information area 87 may be two or more. The information displayed in the information area 87 is not limited to the tire air pressure. Various types of information can be displayed in the information area 87.

As described above, the vehicle display device 1 in the embodiment includes the image display device 3, and the ring 4 serving as the frame member. The image display device 3 is disposed in front of the vehicle's driver and displays images. The ring 4 is disposed on the driver side of the image display device 3 and surrounds a part of the image display region 31a in the image display device 3. When displaying a new image in the surrounding of the ring 4, the image display device 3 displays the new image from the edge of the ring 4 in a slide-in manner.

The ring 4, which is the frame member (decorative member) different from the image display device 3, easily attracts the user's eye. A new image is displayed from the ring 4 in a slide-in manner, thereby causing the user to easily be aware of the start of displaying the new image. The vehicle display device 1 in the embodiment can, thus, facilitate the user to recognize the new image. As a result, the vehicle display device 1 in the embodiment can convey the vehicle's state to the user (driver) more reliably. The new image is displayed from the edge of the ring 4 in a slide-in manner, thereby providing a visual effect that causes the user to view the display such that the display hidden behind the ring 4 seems to appear as being slid.

The inside region 31b surrounded by the ring 4 may be a main display region in the image display device 3. In the main display region, information having high priority in the image display device 3 is displayed. The information having high priority is at least one of the physical amount corresponding to the output speed of the engine, the vehicle speed, and the shift position, for example. In the main display region, the indicator image 62, which indicates an operation state of the vehicle's drive system, may be displayed. When the inside region 31b serves as the main display region, the driver particularly pays attention to the inside region 31b in the image display region 31a. The slide-in display of a new image from the ring 4 surrounding the inside region 31b allows the driver to easily be aware of the appearance of the new image.

When displaying a new image with a change of the display mode according to operation input, the image display device 3 in the embodiment moves the image already being displayed toward the edge of the ring 4 in a slide-out manner, and displays the new image from the edge of the ring 4 in a slide-in manner. The slide-out movement of the image being displayed allows the user to easily understand that a change operation of the display mode is being performed.

When displaying a new image by the interruption display, the image display device 3 in the embodiment displays the new image from the edge of the ring 4 in a slide-in manner without moving the image already being displayed in a slide-out manner. The no slide-out movement of the image being displayed allows the user to easily understand that an interruption display is being performed.

In the embodiment, the ring 4 has the arc portion having an arc shape. In the ring 4 in the embodiment, at least the left end portion 41 is the arc portion having an arc shape. The image display device 3 displays, as respective new images, the alarm image 70 including the frame image 72, the image 80 including the frame image 82, and the second information image 83 including the frame image 85 from the edge of the left end portion 41 in a slide-in manner. The shape of the head of each of the frame images 72, 82, and 85 in the slide-in direction (arrow Y1) matches with the shape of the left end portion 41. The matching between the shape of the head of each of the frame images 72, 82, and 85 and the shape of the left end portion 41 can enhance a stage effect when respective new images are displayed in a slide-in manner.

In the embodiment, the new image displayed in a slide-in manner is the alarm image 70 serving as an alarm display. The slide-in display of the alarm image 70 allows the user to easily be aware of the alarm display. The vehicle display device 1 in the embodiment can, thus, facilitate the user (driver) to recognize that the vehicle's state proceeds to an alarm state. In the interruption display, the alarm image 70 and other images may be displayed in different slide-in manners. For example, images other than the alarm image 70 may be displayed in a fade-in manner in addition to the slide-in display while the alarm image 70 may be displayed in a slide-in manner without being displayed in a fade-in manner.

A display method of the vehicle display device in the embodiment includes a display step. At the display step, the image display device 3 included in the vehicle display device 1 displays a new image in the surrounding of the ring 4. The display step is illustrated in FIGS. 5, 7, and 9, for example. In the display method of the vehicle display device in the embodiment, a new image is displayed from the edge of the ring 4 in a slide-in manner at the display step. The display method of the vehicle display device in the embodiment can, thus, facilitate the user to recognize the new image.

Modification of the Embodiment

The shapes of the frame images 72, 82, and 85 are not limited to those exemplarily illustrated in the embodiment. For example, the frame image 72 may have the side border 72c but may not have at least one of the upper border 72a and the lower border 72b, the frame image 82 may have the side border 82c but may not have at least one of the upper border 82a and the lower border 82b, and the frame image 85 may have the side border 85c but may not have at least one of the upper border 85a and the lower border 85b.

The images displayed in the information display region 31c in a slide-in manner may have no frame images. For example, the alarm image 70 may not have the frame image 72. The new image displayed in a slide-in manner may be recognized by at least the border with the image having been displayed. For example, the alarm image 70 may be structured such that the border with the traveling information image 65 can be recognized when displayed in a slide-in manner. For example, a background of the alarm content image 71 in the alarm image 70 has a color or a luminance different from that of the traveling information image 65. The color or luminance of the background of the alarm content image 71 may be appropriately determined such that the outer shape of the alarm image 70 can be recognized. The shape of the background of the alarm content image 71 is the shape of the region surrounded by the frame image 72, for example.

The direction of the slide-in display of the new image is not limited to those exemplarily illustrated. The direction of the slide-in display may be the direction toward the right side RS in the vehicle width direction W or the vehicle up-down direction H, for example. When the direction of the slide-in display is the direction toward the right side RS, the new image can be displayed from the edge of the right end portion 42 of the ring 4. When the direction of the slide-in display is vehicle up-down direction H, the new image can be displayed from the upper edge or the lower edge of the ring 4 in a slide-in manner.

The frame member disposed on the driver side of the image display device 3 is not limited to the ring 4 exemplarily illustrated. The frame member, which surrounds the image display region 31a, can be formed in various shapes. The frame member is not limited to have a closed shape, for example. For example, the frame member has a C-shape or a U-shape, which is a shape obtained by removing a part of a circular ring. The frame member may be an arc portion at least a part of which has a circular ring shape. The frame member may be fixed so as not to move relative to the image display device 3.

The contents disclosed in the embodiment and the modification can be implemented by appropriately combining them.

The vehicle display device according to the embodiment includes the image display device and the frame member. The image display device is disposed in front of the driver of the vehicle and displays images. The frame member is disposed on the driver side of the image display device and surrounds a part of the image display region in the image display device. When displaying a new image in the surrounding of the frame member, the vehicle display device displays the new image from the edge of the frame member in a slide-in manner. The vehicle display device according to the embodiment has an advantageous effect of allowing a user to easily recognize the display of the new image.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle display device comprising:
   an image display device that is disposed in front of a driver in a vehicle and displays an image; and
   a frame member that is disposed on a driver side of the image display device and surrounds a part of an image display region in the image display device, wherein
   when displaying a new image in a surrounding of the frame member, the image display device displays the new image from an edge of the frame member in a slide-in manner.

2. The vehicle display device according to claim 1, wherein
   when displaying the new image with a change of a display mode according to an operation input, the image display device moves the image being displayed toward the edge of the frame member in a slide-out manner, and displays the new image from the edge of the frame member in the slide-in manner.

3. The vehicle display device according to claim 2, wherein
   when displaying the new image by interruption display, the image display device displays the new image from the edge of the frame member in the slide-in manner without moving the image being displayed in the slide-out manner.

4. The vehicle display device according to claim 1, wherein
   the frame member has an arc portion having an arc shape,
   the image display device displays an image including a frame image as the new image from an edge of the arc portion in the slide-in manner, and
   a shape of a head of the frame image in a slide-in direction matches with the shape of the arc portion.

5. The vehicle display device according to claim 2, wherein
   the frame member has an arc portion having an arc shape,
   the image display device displays an image including a frame image as the new image from an edge of the arc portion in the slide-in manner, and a shape of a head of the frame image in a slide-in direction matches with the shape of the arc portion.

6. The vehicle display device according to claim 3, wherein the frame member has an arc portion having an arc shape, the image display device displays an image including a frame image as the new image from an edge of the arc portion in the slide-in manner, and a shape of a head of the frame image in a slide-in direction matches with the shape of the arc portion.

7. The vehicle display device according to claim 1, wherein the new image is an image of an alarm display.

8. The vehicle display device according to claim 2, wherein the new image is an image of an alarm display.

9. The vehicle display device according to claim 3, wherein the new image is an image of an alarm display.

10. The vehicle display device according to claim 4, wherein the new image is an image of an alarm display.

11. The vehicle display device according to claim 5, wherein the new image is an image of an alarm display.

12. The vehicle display device according to claim 6, wherein the new image is an image of an alarm display.

13. A display method of a vehicle display device that includes an image display device and a frame member disposed on a driver side of the image display device and surrounding a part of an image display region in the image display device, the display method comprising:

a display step of displaying a new image in a surrounding of the frame member by the image display device, wherein at the display step, the new image is displayed from an edge of the frame member in a slide-in manner.

* * * * *